United States Patent [19]

Treshow

[11] 3,957,577
[45] May 18, 1976

[54] HYDRAULIC CONTROL ROD
[75] Inventor: Michael Treshow, Hinsdale, Ill.
[73] Assignee: The United States of America as represented by the United States Energy Research and Development Administration, Washington, D.C.
[22] Filed: June 23, 1955
[21] Appl. No.: 517,665

[52] U.S. Cl. .............................................. 176/36 R
[51] Int. Cl.² ......................................... G21C 7/16
[58] Field of Search ............... 121/38, 193.3, 154.3; 204/193; 176/36 R, 86 R

[56] References Cited
UNITED STATES PATENTS

| 2,217,239 | 10/1940 | Smith | 121/38 |
| 2,688,313 | 9/1954 | Bauer | 121/38 |
| 2,707,867 | 5/1955 | Ruhl | 121/38 |
| 2,736,696 | 2/1956 | Wigner et al. | 204/193 |

Primary Examiner—Harvey E. Behrend
Attorney, Agent, or Firm—Dean E. Carlson; Arthur A. Churm; L. P. Johns

[57] ABSTRACT

Apparatus for shifting a control rod into and out of a nuclear reactor utilizing as pressure fluid the fluid employed as coolant moderator in the reactor.

2 Claims, 10 Drawing Figures

HYDRAULIC CONTROL ROD

This invention relates to an apparatus for moving an object by means of fluid under pressure and more particularly to an apparatus for shifting a control rod into and out of a nuclear reactor by means of a pressure fluid that is also used as a coolant moderator in the reactor.

It is known to cool the fuel rods and control rods of a nuclear reactor by means of fluid flowing in the annular spaces between the rods and tubes that loosely contain the rods. I propose to shift the control rods for varying the operation of the reactor by means of the same fluid that is used for cooling.

My invention is applied to a nuclear reactor that is cooled and moderated by heavy water that is pumped from a low-pressure chamber that together with fuel rods forms the active portion of the reactor to a high-pressure chamber located on top of the low-pressure chamber. The fuel rods are cooled by heavy water that flows downwardly over the fuel rods and within the tubes that contain the fuel rods and extend from the high-pressure chamber well into the low-pressure chamber. Each control rod is cooled by heavy water that flows upwardly over the control rod and within a cylinder that contains the control rod. The lower portion of the cylinder loosely houses the control rod and the upper portion of the cylinder tightly fits the control rod, so that the moderator may flow over the control rod and may shift the control rod within the cylinder by means of the pressure of the moderator acting through interchangeable connections of the high-pressure and low-pressure chambers with different portions of the cylinder.

Figure 1:
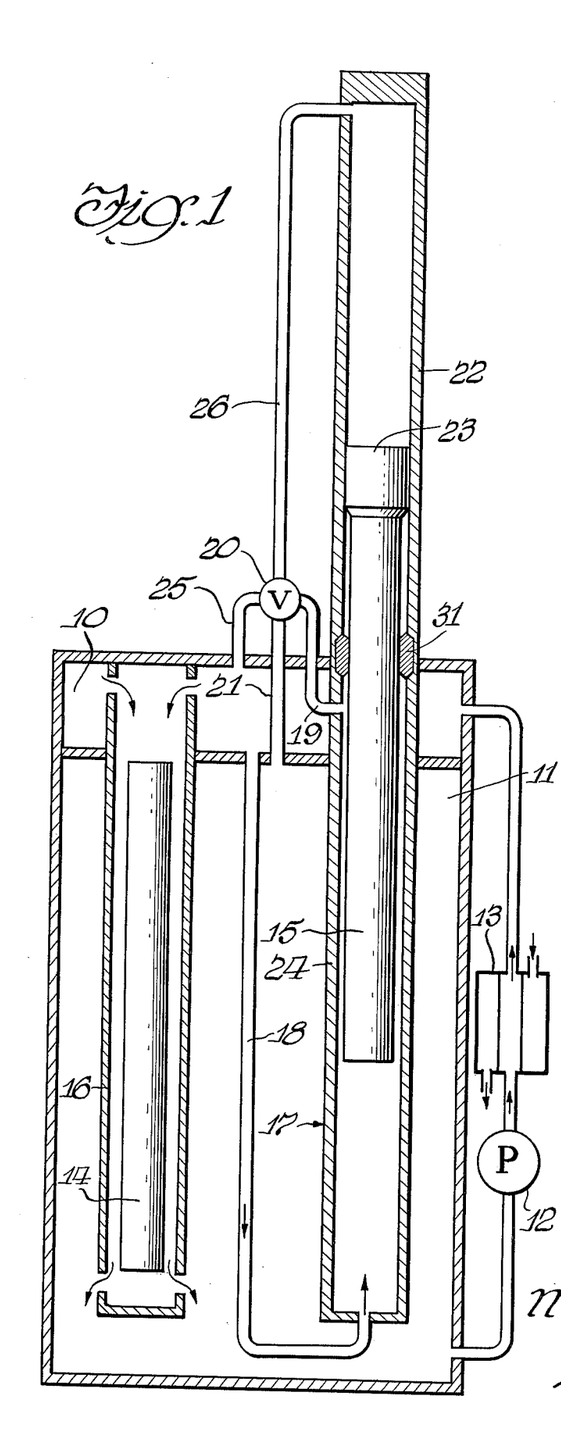
FIG. 1 is a schematic view illustrating the hydraulic adjusting apparatus of the present invention and a nuclear reactor to which it is applied.

With reference to FIG. 1 of the present application, the reactor includes a high-pressure chamber 10, a plenum- or low-pressure-chamber 11, a pump 12, a heat exchanger 13, a plurality of nuclear-fuel rods 14, only one being shown, and a plurality of shiftable control rods 15, only one being shown.

The fuel rods 14 extend vertically through the low-pressure chamber 11 which is filled with a coolant moderator such as heavy water, so that the chamber 11 constitutes the active portion of the reactor. The high-pressure chamber 10 is also filled with coolant moderator, which flows from the high-pressure chamber to the low-pressure chamber through coolant tubes 16 which extend through both chambers and loosely surround the fuel rods 14. Thus coolant moderator flows donwardly in the annular spaces between the coolant tubes 16 and the fuel rods 14 to cool the fuel rods. The pump 12 takes the coolant moderator from the low-pressure chamber 11 and returns it to the high-pressure chamber 10 after putting it through the heat-exchanger 13 which abstracts a considerable portion of the heat obtained by the coolant moderator from the fuel rods 14.

The control rods 15 are formed at least in part of neutron-absorbing material and are vertically adjustable to control the operation of the nuclear reactor. Each control rod is housed in a cylinder 17 and is cooled by coolant moderator which flows in an upward direction in the annular space formed between the control rod and the cylinder. Coolant moderator is supplied to the lower end of the cylinder 17 from the high-pressure chamber 10 through a line 18 and is conducted from an intermediate portion of the cylinder to the low-pressure chamber through line 19, valve 20, and line 21.

From the foregoing description it will be appreciated that the reactor includes a plenum- or high-pressure-chamber, a low-pressure chamber therebelow, vertical fuel rods, vertical control rods, means for flowing coolant moderator downwardly over the fuel rods, and means for flowing coolant moderator upwardly over the control rods.

The novelty in the present application resides in the special construction of the cylinder 17 and its connections with the high-pressure and low-pressure chambers 10 and 11 such that coolant moderator in the cylinder not only cools the control rod 15 but also shifts it lengthwise of the cylinder to control the operation of the reactor. The cylinder 17 has an upper portion 22 which extends upwardly for some distance from the high-pressure chamber 10 and tightly fits a head 23 on the upper end of the control rod 15. The cylinder 17 also has a lower portion 24 which extends from the lower region of the low-pressure chamber 11 about to the top of the high-pressure chamber 10 and is spaced from the control rod which it surrounds. Lines 25, 21, 26, and 19 extend to the valve 20 from the high-pressure valve 10, the low-pressure chamber 11, the top of the upper portion 22 of the cylinder 17, and the top of the lower portion 24 of the cylinder. In a first position (FIG. 2) the valve 20 connects line 25 with line 26 and line 21 with line 19 so as to cause coolant moderator to flow from the high-pressure chamber through lines 25 and 26 into the upper portion 22 of the cylinder 17 and to cause coolant moderator to flow from the top of the lower portion 24 of the cylinder 17 through lines 19 and 21 to low-pressure chamber 11, whereby the control rod 15 is caused to descend into the reactor. In a second position (FIG. 8) the valve 20 connects line 25 with line 19 and line 21 with line 26 so as to cause coolant moderator to flow from the high-pressure chamber 10 through the lines 25 and 19 into the lower portion 24 of the cylinder 17 and coolant moderator to flow out of the upper portion 22 of the cylinder 17 through the lines 26 and 21 into the low-pressure chamber 11, whereby the control rod 15 moves upwardly out of the reactor. In this position of the valve 20 there is no flow of coolant moderator through the lower portion of 24 of the cylinder 17 and over the control rod 15, because coolant moderator is flowing through the line 19 into the cylinder 17 rather than out of it, but this does not matter, because the control rod 17 either is being moved out of the reactor or is in its uppermost position, sufficiently withdrawn from the reactor as to require no cooling. In a third position (FIG. 9) the valve 20 blocks off the lines 25 and 26 and connects the lines 19 and 21 with one another, whereby coolant moderator flows from the high-pressure chamber 10 through the line 18, through the lower portion 24 of the cylinder 17 and over the control rod 15, and through the lines 19 and 21 into the low-pressure chamber 11, with the result that the control rod 15 may occupy some intermediate position such as shown in FIG. 1, because the coolant moderator locked in the cylinder 17 above the control rod 15 prevents it from moving upwards and the coolant moderator flowing into the lower portion 24 of the cylinder will cooperate with the locked-in fluid above the control rod in preventing the control rod from descending. This same third position of the valve 20 may also be employed to hold the control rod 15 in its lowermost position or its uppermost position.

Figure 2:
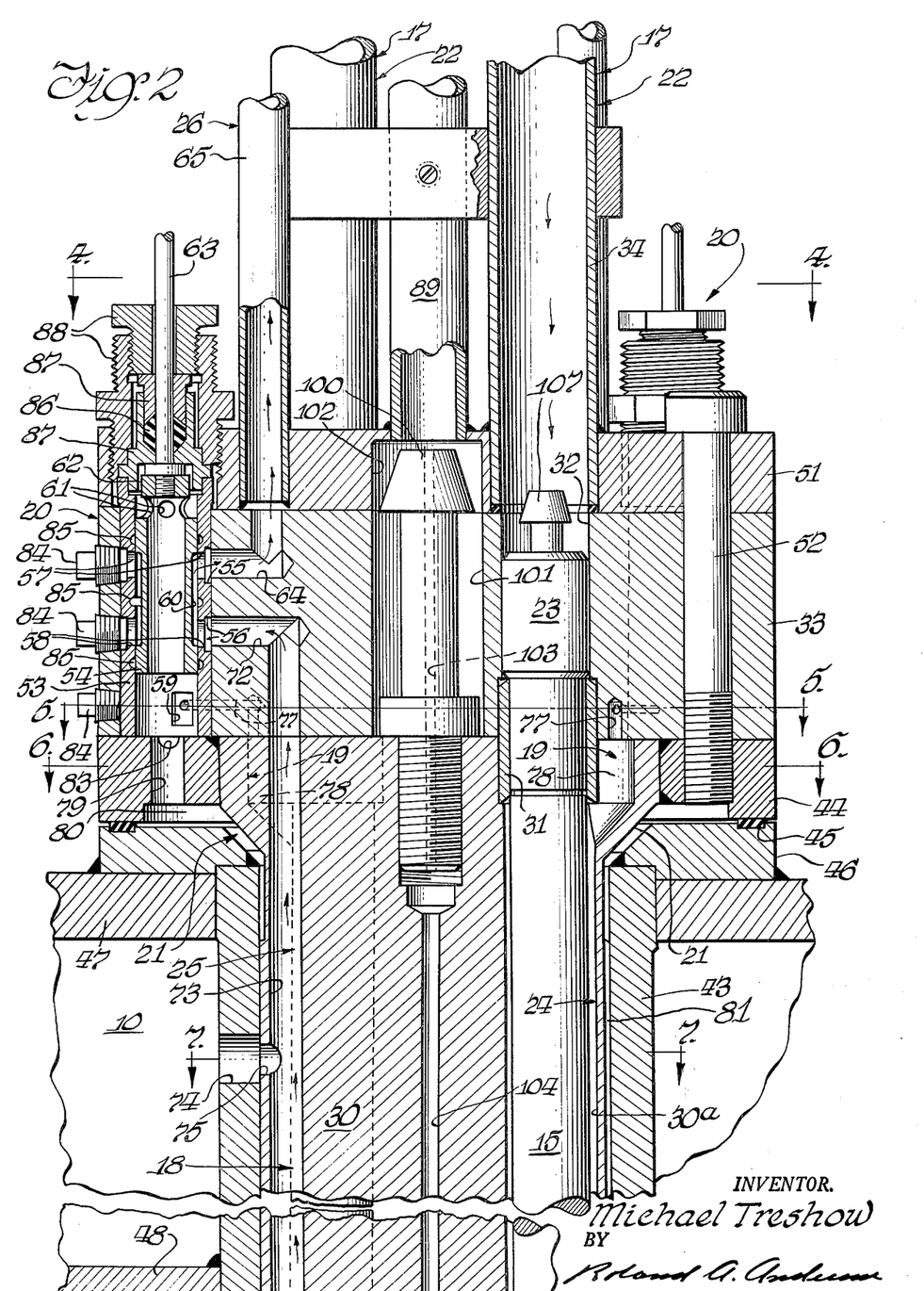
FIG. 2 is a vertical sectional view taken on the line 2—2 of FIG. 4 and showing an intermediate portion of the apparatus of the invention including a valve and associated parts.
Figure 3:
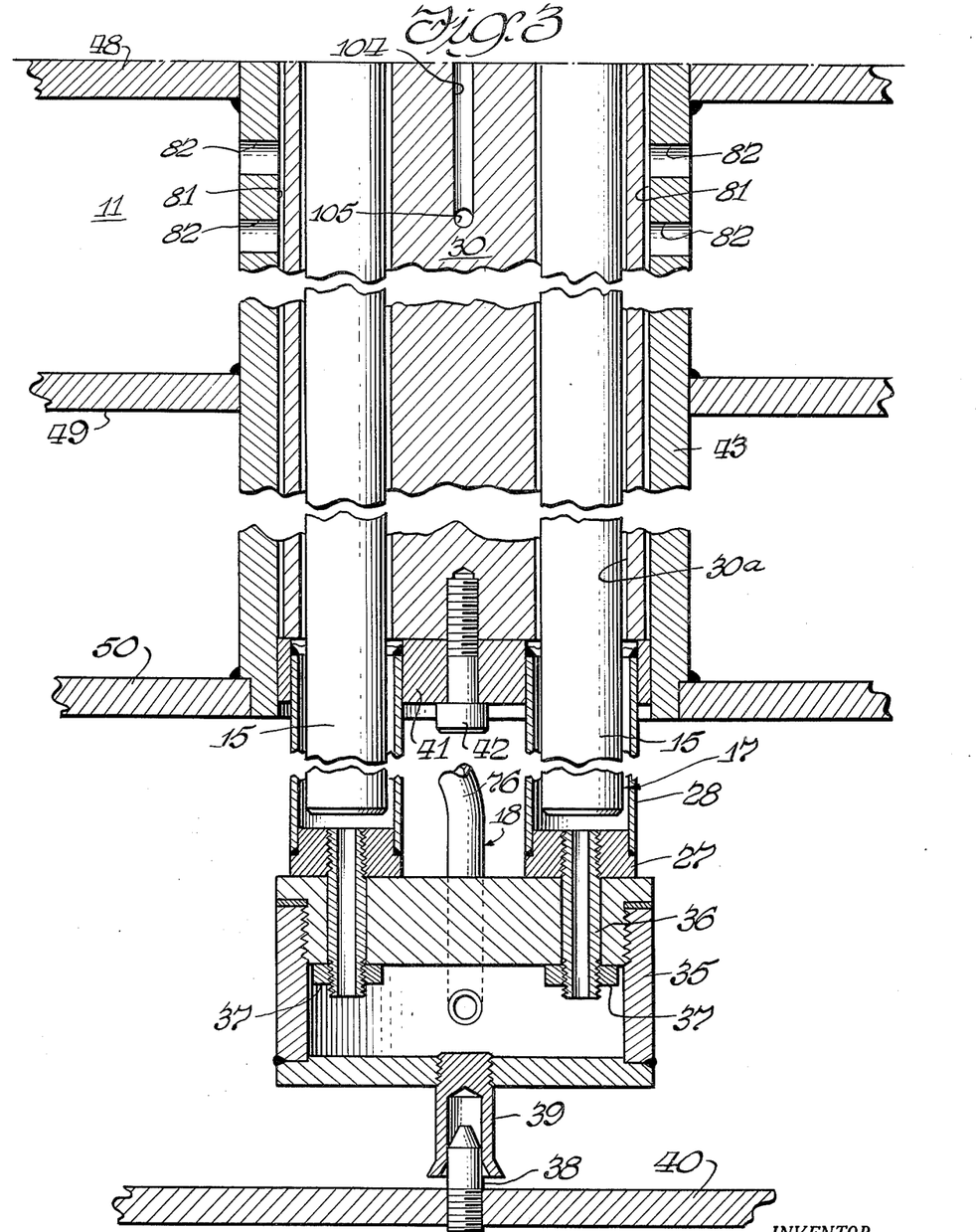
FIG. 3 is a vertical sectional view taken on the line 3—3 of FIG. 4 and showing the lower portion of the apparatus; although there is some change in section from FIG. 2 to FIG. 3, FIG. 3 may be placed directly below FIG. 2 to form therewith a single figure, the dash-dot lines at the bottom of FIG. 2 and at the top of FIG. 3 coinciding.
Figure 10:
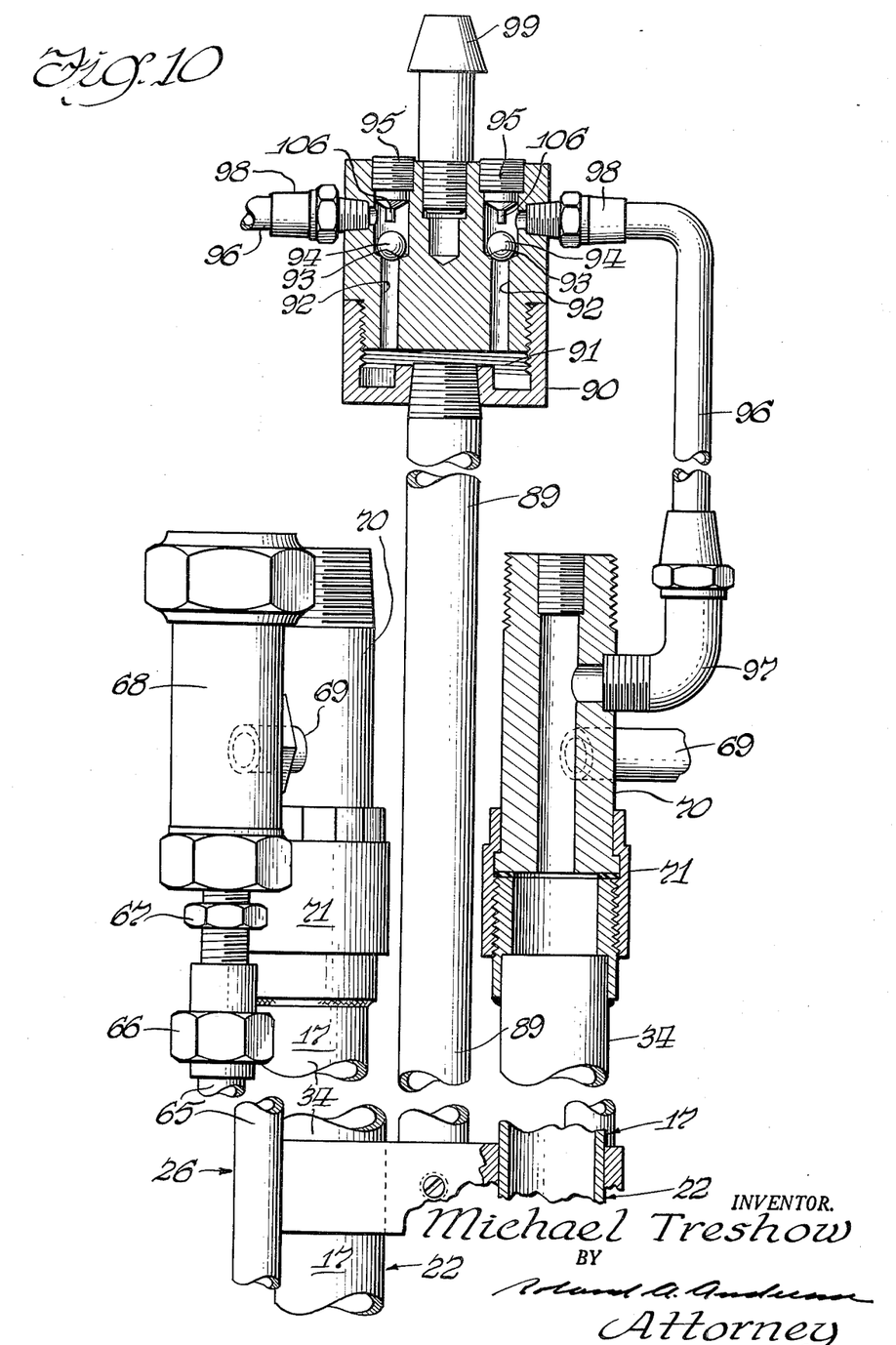
FIG. 10 is an elevational view partly in section of the upper end of the apparatus of the present invention.

As shown in FIGS. 2, 3, and 10, the cylinder 17 for the control rod 15 is formed of a bottom plug 27, a lower tube 28 having its lower end bonded to the plug 27, a block 30 having a passage 30a aligned with the lower tube 28 and extending upwardly from the upper end thereof, a ring 31 set in the upper end of the passage 30a, a valve housing 33 having a passage 33a aligned with the ring 31, and an upper tube 34 extending upwardly from the passage 32 in alignment therewith. The lower tube 28 and the block 30 form the lower portion of the cylinder 17, which portion is designated as 24 in FIG. 1. The housing 33 and the upper tube 34 form the upper portion of the cylinder 17, which portion is designated as 22 in FIG. 1.

As is evident from FIGS. 2, 3, and 10, a plurality of control rods 15 is grouped together. While only two rods are shown, it will be obvious that the inventive principles disclosed herein can be applied to a larger number of control rods.

As shown in FIG. 3, the lower ends of two cylinders 17 for two control rods 15 are secured to a hollow fitting 35 by tubular connectors 36 which are threaded into the bottom plugs 27. Nuts 37 on tubular connectors 36 secure them to the hollow fitting 35. The group of two control rods 15 and their cylinders 17 are located and steadied at their lower ends by means of a stud 38 and a hollow member 39 receiving it. The stud 38 is threaded into a top plate 40 of the lower shield of the reactor, and the hollow member 39 is threaded into the hollow fitting 35. The upper ends of lower tubes 28 are attached to the block 30 by means of a disc 41 in which the tubes are welded and a screw 42 which secures the disc 41 to the block 30. The ring 31 lies between the upper and lower portions 22 and 24 of the cylinder and has a smaller internal diameter than these portions so that it tightly fits the control rod 15 and is engageable with the control-rod head 23 to limit downward movement of the control rod.

As shown in FIG. 2, the block 30 fits tightly in a sleeve 43 and is supported therein by means of a ring flange 44 which rests upon an annular seal 45 set in a ring flange 46 which is welded to the upper end of the sleeve 43. The ring flange 44 is secured to the upper end of the block 30 by welding. The sleeve 43 extends through top and bottom plates 47 and 48 of the high-pressure chamber 10 and top and bottom plates 49 and 50 of an upper shield in the low-pressure chamber 11. The lower end of the sleeve 43 rests on the bottom plate 50. The sleeve 43 is sealed by welding to the bottom plate 48, and welding of the ring flange 46 to the top plate 47 seals the sleeve 43 thereto. The upper tubes 34 of the cylinder 17 have their lower ends inserted in and welded to a plate 51 which lies upon the valve housing 33. The plate 51 and the valve housing 33 are secured to the ring flange 44 by a plurality of screws 52 which extend therethrough into threaded engagement with the ring flange 44. The weight of the parts borne by ring flange 44, including tubes 34, housing 33, and block 30, holds the ring flange 44 down against the seal 45 in the ring flange 46.

Figure 8:
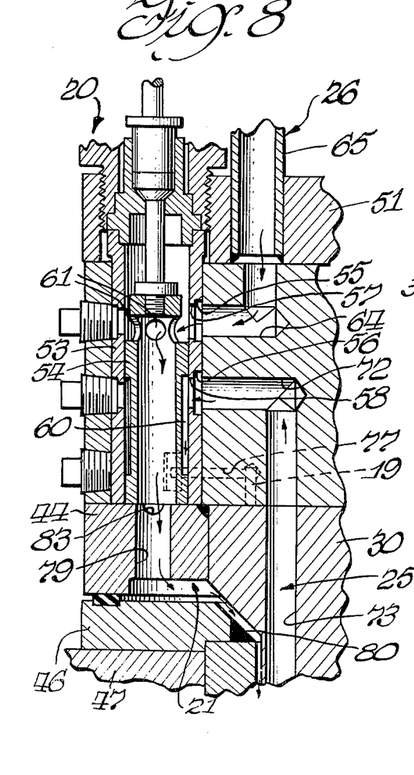
FIG. 8 is a fragmentary sectional view similar to FIG. 2 and showing only the valve and directly adjacent parts, the valve being in a different position from that of FIG. 2.
Figure 9:
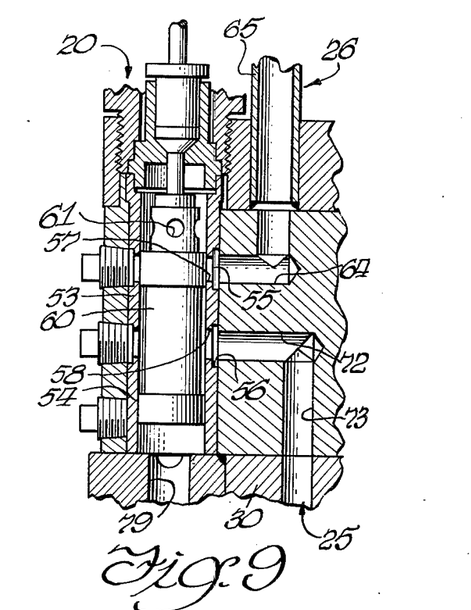
FIG. 9 is a fragmentary sectional view similar to FIG. 8, but showing the valve in another different position.

As shown in FIGS. 2, 8, and 9, the valve 20 comprises essentially an outer stationary sleeve 53 which is fixedly mounted in the valve housing 33 and an inner movable sleeve 54 which is mounted in the outer sleeve for axial movement with respect thereto. The outer sleeve 53 has upper and lower external circumferential grooves 54 and 56 which are axially spaced from one another and two pluralities of circumferentially spaced openings 57 and 58 which connect the grooves 55 and 56, respectively, with the interior of the outer sleeve 53. The outer sleeve is also provided with a generally rectangular opening 59 near but spaced from the lower end. The inner valve sleeve 54 has an external circumferential depression 60 which has sufficient axial length to overlap the openings 57 and 58 in the outer sleeve 53 when the inner sleeve 54 is in the position of FIG. 2. The upper end of the inner valve sleeve 54 has a plurality of circumferentially spaced openings 61 and a reduced head 62 to which is threadedly connected a stem 63 through which adjustment of the inner sleeve 54 may be affected.

The upper groove 55 in the stationary outer valve sleeve 53 lies at and in communication with one end of a passage 64 formed in the valve housing 33. The other end of the passage 64 communicates with the lower end of a conduit 65 which is inserted in and welded to the plate 51. As shown in FIG. 10, the upper end of the conduit 65 is connected with the upper end of the cylinder 17 successively through a coupling 66, a coupling 67, a T-fitting 68, a short conduit 69, a fitting 70, and a coupling 71, all of which together with conduit 65 and the passage 65 constitute the line 26, which as shown in FIG. 1 connects the valve 20 with the upper end of the cylinder 17. The upper ends of the fittings 68 and 70 are closed by plugs.

The lower annular groove 56 in the stationary outer valve sleeve 53 lies at and in communication with one end of a passage 72 formed in the housing 33. The other end of passage 72 communicates with the upper end of a passage 73 formed in the block 30. Registering openings 74 and 75 formed, respectively, in the sleeve 43 and in the block 30 at an intermediate region in the length of the passage 73 connect the high-pressure chamber 10 with the passage 73. The line 19, which as shown in FIG. 1, connects the high-pressure chamber 10 with the valve 20, consists of the passage 72, the upper portion of the passage 73, and the openings 74 and 75.

The passage 73 extends downwardly below the opening 74 as shown in FIG. 2 and goes to the bottom of the block where it is connected with the upper end of a conduit 76. The lower portion of the passage 73 and the connection of the conduit 76 therewith are not shown, because the plane of the section of FIG. 3 does not cut the passage 73. The lower end of the conduit 76 is connected with the hollow fitting 35, as shown in FIG. 3. The line 18, which as shown in FIG. 1 connects the high-pressure chamber 10 with the lower end of the cylinder 17, consists of the openings 74 and 75, the portion of the passage 73 therebelow, the conduit 76, the fitting 35, and the tubular connector 36.

Figure 4:
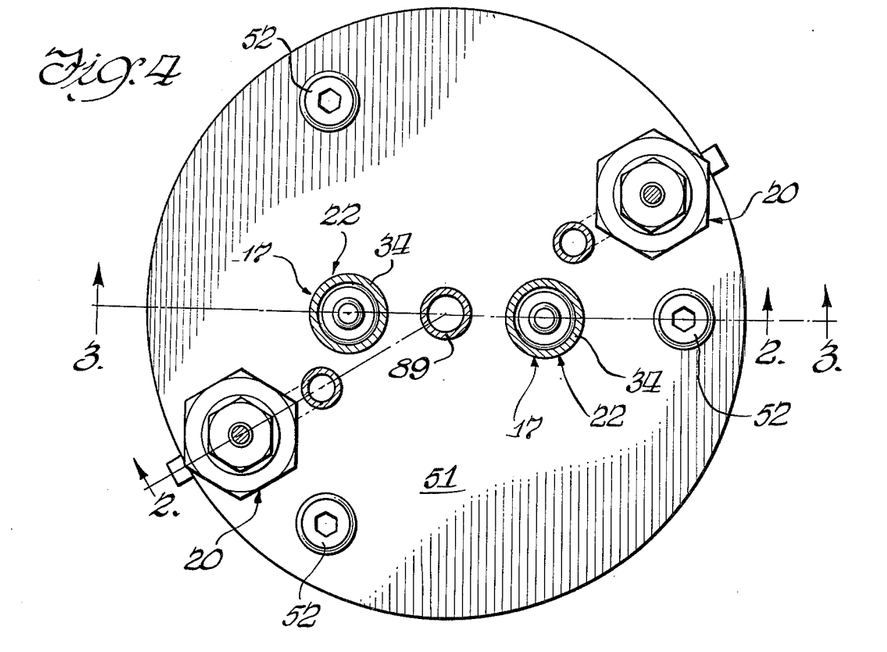
FIG. 4 is a horizontal sectional view taken on the line 4—4 of FIG. 2.
Figure 5:
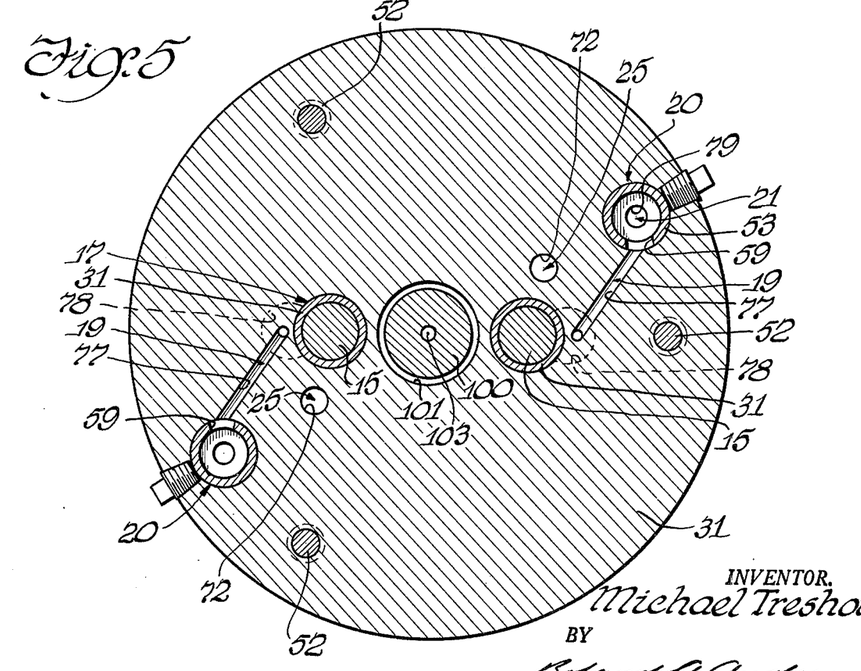
FIG. 5 is a horizontal sectional view taken on the line 5—5 of FIG. 2.

FIGS. 4 and 5 show that there are two valves 20, one for each of the control-rod cylinders 17. Each valve 20 is connected with the high-pressure chamber 10 by a separate line 19, and thus there are two passages 73, each of which forms a part of the line 19. However, only the passage 73 shown in FIG. 2 has a lower portion extending below the openings 74 and 75, since there is only one conduit 76 for the two control-rod cylinders 17. Thus that passage 73 that is to the right of FIG. 7 and is not shown in FIG. 2 may terminate at the openings 74 and 75 and should have a closed lower end.

Figure 6:
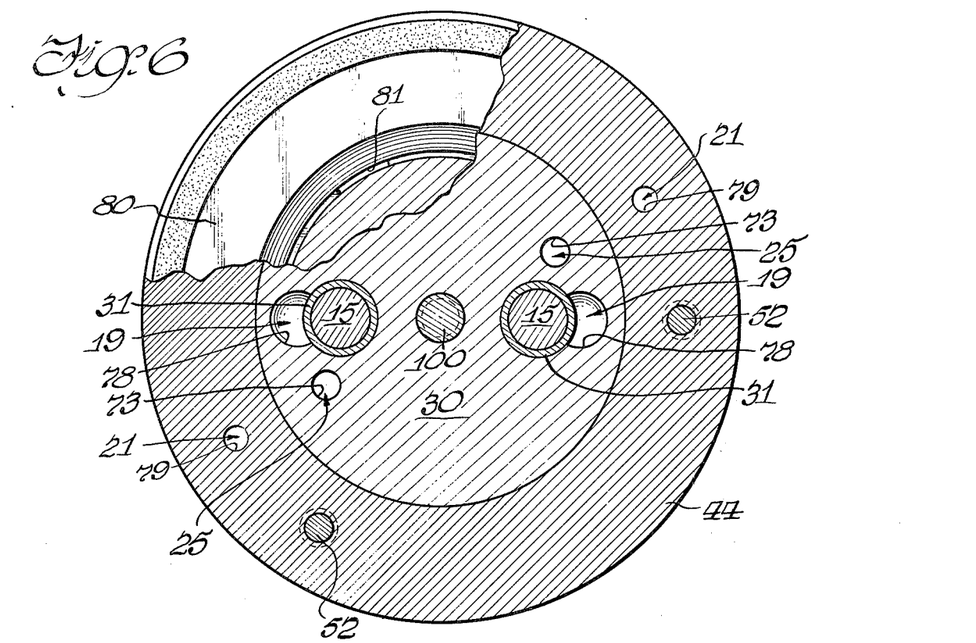
FIG. 6 is a horizontal sectional view taken on the line 6—6 of FIG. 2.

As shown in FIGS. 2 and 5, the opening 59 in the outer fixed valve sleeve 53 lies at and in communication with one end of a passage 77, and the other end of this passage communicates with a recess 78, which is shown in FIGS. 2 and 6, is formed in the block 30 outward of the ring 31 and in communication therebelow with the upper end of the passage 30a in the block 30. The conduit 19, which as shown in FIG. 1 connects the valve 20 with the upper end of the lower portion 24 of the cylinder 17 consists of the passage 77 and the recess 78.

Figure 7:
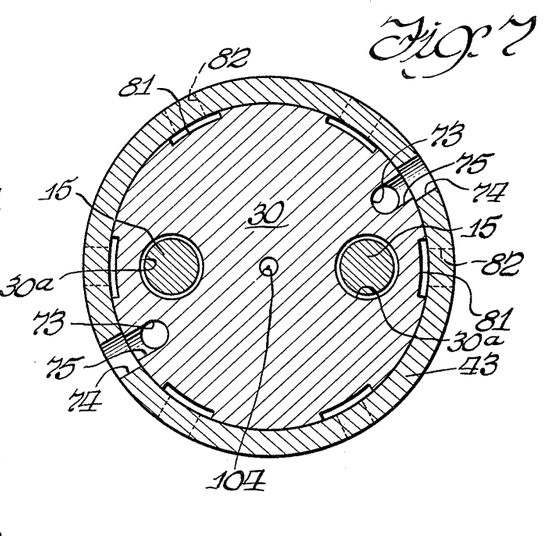
FIG. 7 is a horizontal sectional view taken on the line 7—7 of FIG. 2.

As shown in FIGS. 2 and 5, an opening 79 in the ring flange 44 connects the interior of the outer valve sleeve 53 with an annular space 80, which is formed between a recess in the lower side of the ring flange 44 and the upper surface of the ring flange 46, between spaced opposed conical surfaces of the block 30 and the ring flange 46, and between spaced opposed cylindrical surfaces on the block 30 and the sleeve 43. From the annular space 80 extends a plurality of circumferentially spaced axial passages 81, which as shown in FIGS. 3, 6, and 7, are formed by the inner surface of the sleeve 43 and axial grooves in the exterior of the body 30. Openings 82 in the sleeve 43 place the passages 81 in communication with the low-pressure chamber 11, as shown in FIGS. 3 and 7. The line 21, which as shown in FIG. 1 connects the valve 20 with the low-pressure chamber 11, consists of the opening 79 in the ring flange 44, the annular space 80, the axial passages 81, and the openings 82. The line 21 connected with valve 20 for the one cylinder 17 is connected with the line 21 for the valve 20 of the other cylinder, because there is a single annular space 80 connected with the two openings 79 leading from the two valves 20. This arrangement facilitates draining. Draining is also aided by an annular groove 83 which is formed in the upper side of the ring flange 44 so as to intersect and thereby interconnect the two openings 79.

When the inner valve sleeve 54 is in its upper position of FIG. 2, the depression 60 formed therein overlaps both sets of openings 57 and 58 and grooves 55 and 56 in the outer sleeve 53 and so provides communication between the passages 72 and 64 in the housing 33. Thus coolant moderator flows from the high-pressure chamber 10 into the upper end of the cylinder 17 and acts against the piston head 23 on the control rod 15 to move the control rod down into the reactor.

In the position of FIG. 2, the inner valve sleeve 54 does not block the opening 59, and so the opening 79 and the passage 77 are in communication. Thus coolant moderator can escape from the lower cylinder portion 24 to the low-pressure chamber 11, since the lines 19 and 21, of which the passage 77 and the opening 79 form parts, respectively, are connected. Consequently, there is no positive resistance to downward movement of the control rod 15 in the cylinder 17, and the coolant moderator flows over the control rod 15 as it is being moved down into the reactor.

When the inner valve sleeve 54 is in the lower position of FIG. 8, the external depression 60 therein overlaps the openings 58 and 59 in the outer sleeve 53 so that the passages 72 and 77 are connected and likewise the lines 25 and 19, of which the passages 72 and 77 form parts, respectively. Consequently, coolant moderator flows from the high-pressure chamber 10 into the upper end of the lower portion 24 of the cylinder through the lines 25 and 19 and also into the bottom of the cylinder through the line 18. Escape of the coolant moderator from the lower portion 24 of the cylinder is prevented, because in the position of FIG. 8 the lower end of the inner valve sleeve 54, by going below the opening 59 in the outer sleeve 53, provides a block between the passage 77 and the opening 79 and thus between lines 19 and 21, of which passage 77 and opening 79, respectively, form parts, and so the upper end of the lower portion 24 of the cylinder is disconnected from the low-pressure chamber 11. Coolant moderator only enters the lower portion 24 of the cylinder and does not escape therefrom; the control rod 15 is positively urged upwardly out of the reactor. At the same time the openings 61 in the inner sleeve 54 lie at the level of the openings 57 in the outer sleeve 53 so as to connect the line 26 with the line 21 and thus the upper end of the cylinder 17 with the low-pressure chamber 11. Thus there is no resistance to upward movement of the control rod 15.

When the inner valve sleeve 54 is in the intermediate position of FIG. 9, it blocks the upper openings 57 in the outer valve sleeve 53 and the line 26 leading to the upper end of the cylinder 17, since the depression 60 and the openings 61 are displaced from the openings 57. Thus coolant moderator can neither enter nor escape from the upper end of the cylinder 17, and the control rod 15 is prevented from moving upwards. Downward movement of the control rod is prevented by the coolant moderator locked in the cylinder above the control rod and also by the flow of coolant moderator into the lower portion 24 of the cylinder through the line 18. Coolant moderator exists from the upper end of the lower portion 24 of the cylinder, because the inner valve sleeve 54 does not block off the opening 59 in the outer sleeve 53, and thus the lines 19 and 21 are connected to one another. When the inner valve sleeve 54 is in the position of FIG. 9, the control rod may be maintained in any desired position such as the intermediate position of FIG. 1 and the uppermost and lowermost positions.

As shown in FIG. 2, three threaded plugs 84 close openings in the side of the valve housing 33, which openings provided access for a cutting tool that was used to form the portions of the passages 64, 72, and 77 which lead to the outer valve sleeve 53. Three O-ring seals 85 are mounted in grooves in the interior of the outer valve sleeve 53 in engagement with the inner valve sleeve 64 to make the valve 20 leak-tight. A gasket 86 embraces and is compressed against the valve stem 63 against leakage therealong by parts 87 which are applied to opposite ends of the gasket by fittings 88 which have threaded engagement with one another and one of which has a threaded mounting in the plate 51.

As shown in FIGS. 2 and 10, a tube 89 has its lower end welded to the plate 51 and extends upwardly therefrom between the tubes 34 which constitute the upper portions 22 of the two cylinders 17. The upper end of the tube 89 is above the fittings 70 on the upper ends of the tubes 34 and is secured in a valve body 90 which has a chamber 91 and two passages 92 extending upwardly therefrom. These passages have shoulders 93 serving as seats for ball valves 94 and are closeod at their upper ends by plugs 95 threaded into the valve body 90. The upper end of each tube 34 is connected with one passage 92 above the ball valves 94 therein by means of the fitting 70, a conduit 96, and connectors 97 and 98 secured to the ends of the conduit 96 and to the fitting 70 and the valve body 90, respectively. A lifting stud 99 is threaded into the top of the valve body 90.

As shown in FIG. 2, a lifting stud 100 is threaded into the block 30 and extends upwards therefrom through opening 101 in housing 33 and into recess 102 in plate 51, where its upper end is directly adjacent the lower end of the tube 89. A passage 103 extends through the stud 100. A passage 104 formed in the block 30 extends downwardly from the lower end of the stud 100 to a region below the bottom plate 48 of the high-pressure chamber 10. A cross passage 105 extends from the bottom of the passage 104 to an opening, not shown, in the sleeve 43. Thus the low-pressure chamber 11, or more exactly a helium atmosphere over the coolant moderators in said chamber, communicates with the valve body 90 through the passages 105, 104, and 103 and the tube 89.

The ball valves 94 are normally seated against the shoulders 93 and close off the upper ends of the cylinders 17 to the tube 89 and the passages therebelow leading to the low-pressure chamber 11, because the coolant moderator in the upper portions 22 of the cylinders 17 is under pressure, because coolant moderator is being added to said upper portions 22 to move the control rods 15 down, or because coolant moderator in said upper portions is being pushed upward by the upward pressure on the control rods. However, when the control rods 15 are to be removed from their cylinders 17, the screws 52 are removed so that the assembly comprising the plate 51, the tubes 34, 65, and 89, and the valve body 90 are removed by a lifting apparatus applied to the lifting stud 99. The connection of the helium atmosphere in the chamber 11 with the tube 89 through the passages 103, 104, and 105 permits the assembly to be easily freed from the valve housing 33. As the plate 51 moves upwardly from the housing 33 atmospheric pressure lifts the ball valves 94 from the shoulders 93, so that the coolant moderator in the tubes 34 drains out immediately. Depending projections 106 on the plugs 95 limit movement of the valves 93 off the seats 92.

A lifting projection 107 extending from the head 23 on each control rod 15 facilitates the removal of the control rod from the block 30 and the tube 28 after the plate 51 and tubes 34, 65, and 89 have been removed from the housing 33 and housing 33 has been removed from the block 30. Now the block 30, the tubes 28, and the hollow fitting 35 can be removed as a unit by lifting apparatus applied to the stud 100.

The valve housing 33, ring flanges 44 and 46, block 30, sleeve 43, disc 41, conduit 76, lower tubes 28, plugs 27, tubular connectors 36, nuts 37, and hollow fitting 35 are formed of aluminum. The tubes 34 and 89, conduits 65, plate 51, valves 20, lifting stud 100, screw 42, stud 38, and hollow member 39 are formed of stainless steel. The parts associated with the upper ends of the tubes 34 and 89 and conduits 65 are also formed of stainless steel.

The intention is to limit the invention only within the scope of the appended claims.

What is claimed is:

1. In a nuclear reactor comprising an active portion having a vertical nuclear-fuel rod and a low-pressure chamber containing a coolant moderator in which the nuclear-fuel rod is positioned, a high-pressure chamber positioned over the low-pressure chamber, a vertical tube containing the fuel rod and extending into the high-pressure chamber, a pump for moving the coolant moderator from the low-pressure chamber to the high-pressure chamber and thereby causing the coolant moderator to be drawn through the tube over the nuclear-fuel element from the high-pressure chamber to the low-pressure chamber, and a vertical control rod, the combination with the chambers and the control rod, of a vertical cylinder housing the control rod and extending through the chambers and upwardly beyond the high-pressure chamber, the cylinder having an upper portion extending from the top to the high-pressure chamber and closely fitting the control rod and a lower portion extending from the bottom to the upper portion and loosely receiving the control rod so as to provide an annular space for coolant moderator about the control rod, means including a valve having a first position in which it connects the top of the upper portion of the cylinder with the low-pressure chamber and the top of the lower portion of the cylinder with the high-pressure chamber for moving the control rod upward, a second position in which it connects the top of the upper portion of the cylinder with the high-pressure chamber and the top of the lower portion of the cylinder with the low-pressure chamber for moving the control rod downward, and a third position in which it connects the top of the lower portion of the cylinder with the low-pressure chamber and blocks the top of the upper portion of the cylinder by cutting it off from both chambers for holding the control rod against movement and a line continuously connecting the bottom of the cylinder with the high-pressure chamber for cooperating with the connection of the top of the lower portion of the cylinder with the low-pressure chamber in the second and third positions of the valve in causing coolant moderator to flow upwardly over that part of the control rod located in said lower portion.

2. In an assembly comprising a low-pressure chamber, high-pressure chamber positioned adjacent thereto, and a rod adapted to be moved into and out of the low-pressure chamber; the combination therewith, of a cylinder enclosing the rod and having a first portion located in the low-pressure chamber and loosely fitting the rod and a second portion located out of the low-pressure chamber and tightly fitting the rod, a first line continuously connecting the high-pressure chamber with the end of the loosely fitting portion of the cylinder away from the tightly fitting portion, a valve, a second line connecting the valve with the end of the loosely fitting portion of the cylinder adjacent the tightly fitting portion, a third line connecting the valve with the end of the tightly fitting portion of the cylinder away from the loosely fitting portion, a fourth line connecting the valve with the high-pressure chamber, and a fifth line connecting the valve with the low-pressure chamber; whereby in a first position of the valve the third and fourth lines are connected to allow fluid from the high-pressure chamber to flow into the tightly fitting portion of the cylinder in order to move the rod into the low-pressure chamber and the second and fifth lines are connected to allow fluid to enter the loosely fitting portion of the cylinder through the first line, flow along the rod and exit from said loosely fitting portion through the second and fifth lines; in a second position of the valve the third and fifth lines are connected to allow fluid to escape to the low-pressure chamber from the tightly fitting portion of the cylinder and the second and fourth lines are connected so as to supplement the first line in supplying fluid from the high-pressure chamber to the loosely fitting portion of the cylinder for forcing the rod out the first chamber; and in a third position of the valve the third line is blocked to lock fluid in the tightly fitting portion of the cylinder for preventing the rod from moving in a direction outward of the low-pressure chamber and the second and firth line are connected to allow fluid to enter the loosely fitting portion of the cylinder through the first line, flow along the rod and exit from said loosely fitting portion of the cylinder through the second and fifth lines to the low-pressure chamber, this fluid aiding the fluid locked in the tightly fitting portion of the cylinder in preventing the rod from being moved in a direction inward of the low-pressure chamber.

* * * * *